United States Patent [19]
Kuriyama et al.

[11] Patent Number: 5,459,821
[45] Date of Patent: Oct. 17, 1995

[54] METHOD AND APPARATUS FOR GENERATING A FREE-FORM SURFACE

[75] Inventors: Shigeru Kuriyama; Hiroshi Minakata, both of Tokyo; Naoki Urano, Machida; Kazuya Shimizu, Matsudo, all of Japan

[73] Assignee: International Business Machines Corporation, Armonk, N.Y.

[21] Appl. No.: 967,467

[22] Filed: Oct. 23, 1992

[30] Foreign Application Priority Data

Nov. 7, 1991 [JP] Japan ..................................... 3-318587

[51] Int. Cl.$^6$ .................................................. G06T 17/20
[52] U.S. Cl. .......................................... 395/120; 395/142
[58] Field of Search ..................................... 395/120, 126, 395/130, 141, 142

OTHER PUBLICATIONS

A Multisided Generalization of Bezier Surfaces, C. T. Loop and T. D. Rose, Univ. of Wash., ACM Transactions on Graphics, vol. 8, No. 3, Jul. 1989, pp. 204–234.

Curvature Continuous Triangular Interpolants, H. Hagen & H. Pottman, Math. Methods in Computer Aided Geom. Design, 1989, pp. 373–384.

Sweep Surfaces Modelling Via Coordinate Transformations and Blending, K. Choi and C. Lee, Korean Adv. Inst. of Science, vol. 22, #2, Mar. 1990, pp. 87–96.

Primary Examiner—Heather R. Herndon
Assistant Examiner—Michael S. Smith
Attorney, Agent, or Firm—Mark S. Walker

[57] ABSTRACT

A method for generating a multisided patch in which the expression form of each boundary curve and topology of the curve network can freely be set, curve formulae can be simply input, and high continuity. By inputting data of boundary curves to multisided patch generator via editing means which generates and edits curves, and blending sweep surfaces in two stages, a free-form surface is generated as a surface interpolating them. That is, data of a plurality of boundary curves is inputted to multisided patch generator, each given curve is swept by sweeping means along the curves intersecting it to generate surfaces, and the surfaces are blended by blending means in two stages, thereby generating a free-form surface. Since the surface formulae can be defined on the basis of the curve formulae of the boundaries, topology of the curve network and the descriptive form of each curve can freely be set, so that the boundary curve formulae of a multisided patch can be simply input by directly drawing the curve shapes on defined two-dimensional planes. In addition, geometric continuity of the generated surface is high because continuity of the given curves is high.

10 Claims, 16 Drawing Sheets

METHOD AND APPARATUS FOR GENERATING A FREE-FORM SURFACE

BACKGROUND OF THE INVENTION

1. Field of the Invention

The present invention is related to a free-form surface generation method for generating a free-form surface, and particularly to a method and arrangement for generating a multisided patch used in a surface modeler for design.

2. Description of the Related Art

In the prior surface design system, a surface is usually generated by inputting and editing the control points of its surface model (a method for mathematical definition of a surface). Most of the conventional design systems have handled only four-sided patches represented by tensor product surfaces, because the object of interest often had a surface shape formed mainly of rectangular regions as in a car body. However, as the shape of the object of interest became complicated, a method for generating a patch defined by an arbitrary number of sides (topology) has become a technical problem.

The following are rough classifications of the mathematical models proposed up to now of patch surfaces which are free from topology restrictions:

(a) A surface generation method using a three-sided patch which is represented by a rational polynomial of three variables representing a barycentric coordinate system. This approach is disclosed, for instance, in:

Hagen, H. and Portmann, H., "Curvature continuous triangular interpolants", Lyche, T. and Schumaker, L., eds., *Mathematical Methods in Computer Aided Geometric Design*, pp. 373–384, Academic Press, (1989); and Nielson, G. M., "Transfinite, Visually Continuous, Triangular Interpolant", Farin, G. ed., *Geometric Modeling: Algorithms and New Trends*, pp. 235–246, SIAM, (1987).

(b) An algorithm for generating a multisided patch by a polynomial consisting of a multivariable coordinate system.

This approach is disclosed, for instance, in: Loop, C. T. and DeRose, T. D., "A Multisided Generalization of Bezier Surfaces", *ACM Trans. on Graphics*, Vol. 8, No. 3, pp. 204–234, (1989).

The restriction common to the above-mentioned approaches resides in that, since a multisided patch is to interpolate the data corresponding to each vertex of a polygon representing a region, the form of expressing a curve corresponding to each side of the polygonal region is limited. For instance, in Loop's approach, each boundary curve should be expressed by one Bezier polynomial.

Also, in Japanese Patent Application Laid-Open No. 80373/1991 official gazette, there is described a method for generating a free-form surface in a solid shape including rational curves. In this invention, an extended cubic rational Bezier patch is used as a formula-defining curve. Since this type is to generate only a four-sided patch, the surface of which is defined by two variables u and v, in order to span a surface over a region other than a four-sided shape, the region needs to be subdivided into a plurality of four-sided regions as depicted in FIGS. 5, 6 and 12 of the application. A surface formula has a restriction that the curve formula representing the boundaries of a surface is expressed by one rational cubic formula, so that there are many restrictions on the form of parametric expression of a curve formula. In addition, only continuity of G1 class is guaranteed to continuity of the connection between the generated surfaces. Although it may be possible to generate a surface having continuity of a higher degree (Gn, n≧2nd class) by increasing the degree of a surface, no specific calculation method of control points in that case is shown.

Further, in Japanese Patent Application Laid-Open No. 221073/1987 official gazette, a method for creating a free-form surface using a Bezier surface is disclosed, but it can deal with only a four-sided patch surface as in the invention described in the previously stated official gazette, and there are also restrictions on the form of parametric expression of boundary curves. Moreover, a cubic Bezier patch surface does not guarantee even continuity of G1 class in regards to the connection between patches.

In addition, in Japanese Patent Application Laid-Open Nos. 216076/1987, 135965/1987 and 248280/1989 official gazettes, methods for generating a free-form surface are disclosed, wherein continuity of the connection between surface patches is of G1 class, but in any of them, the restrictions on the number of sides of a patch and the form of parametric expression of boundary curves still remain unresolved.

As described above, since the prior methods have many restrictions on the form of expressing a patch, the relationship between the control points of a surface model and a generated surface is defined by the used surface model when the control points are inputted and edited, and it does not always coincide with the intuition of a designer. For example, in a B-spline model, the control points need to be inputted as points which are not existing on a target surface, and it is also required to observe a restriction that they must be disposed on a two-dimensional lattice. For this, complex work must be performed even if a shape such as of an egg is inputted, which seems simple to the human eye.

Accordingly, in a site where a free-form surface is actually designed, a designer expresses the shape desired to be designed by a sketch or model, an operator familiar with the internal model of a surface design system inputs a surface model while measuring the above-mentioned sketch or model, the designer instructs the operator to perform more detailed editing work while checking the input figure, and the operator translates it to an edit operation prepared by the design system and inputs it. Such work is obviously inefficient because a third party called an operator intervenes between the designer and the design system.

SUMMARY OF THE INVENTION

It is an object of the present invention to provide a method for generating a multisided patch in which the descriptive form of each boundary curve and topology of the curve network can arbitrarily be set.

It is another object of the present invention to generate a patch to be spanned over an m-sided region (m>2) surrounded by boundary curves given in any form so that it has continuity coinciding with geometrical continuity of the given curves.

It is another object of the present invention to provide a method wherein the expressions of the boundary curves of a multisided patch can be interactively input by direct drawing of the curve shapes rather than by indirect control point manipulation when creating an object of a free-form surface.

In accordance with the present invention, when data of a plurality of boundary curves is inputted, a surface interpolating those curves is generated by blending curve sweep objects in two stages. The surface is generated by sweeping the individual given curves along the curves intersecting them to generate surfaces, and blending the sweep surfaces in two stages. Since the surface formulas are defined by multivariable barycentric coordinates and on the basis of the curve formulas of the boundaries, topology of the curve network and the descriptive form of each curve can arbitrarily be set. Accordingly, the boundary curve formulas of a multisided patch can be inputted by directly drawing the curve shapes on defined two-dimensional planes. The expression of surfaces becomes simple because curve formulas are directly inputted, and in addition, as continuity of given curves is high, geometric continuity of the generated surfaces also becomes high.

In accordance with the present invention, a method for generating a multisided patch can be provided in which topology of a curve network and the descriptive form of each curve can arbitrarily be set. In addition, a patch surrounded by boundary curves given in an arbitrary form can be generated so as to have high continuity of the same degree as geometric continuity of the given curves.

Moreover, since means can be used in which, when a free-surface object is created, a shape is inputted by direct drawing rather than by indirect control point manipulation, curves can be simply inputted and edited, and the free-surface object of interest can be easily created. dr

DESCRIPTION OF THE PREFERRED EMBODIMENTS

The system for generating a multisided patch according to the present invention is now described. The invention disclosed in the following description is related to a system for generating a multisided patch from a group of curves giving boundaries.

Figure 1:
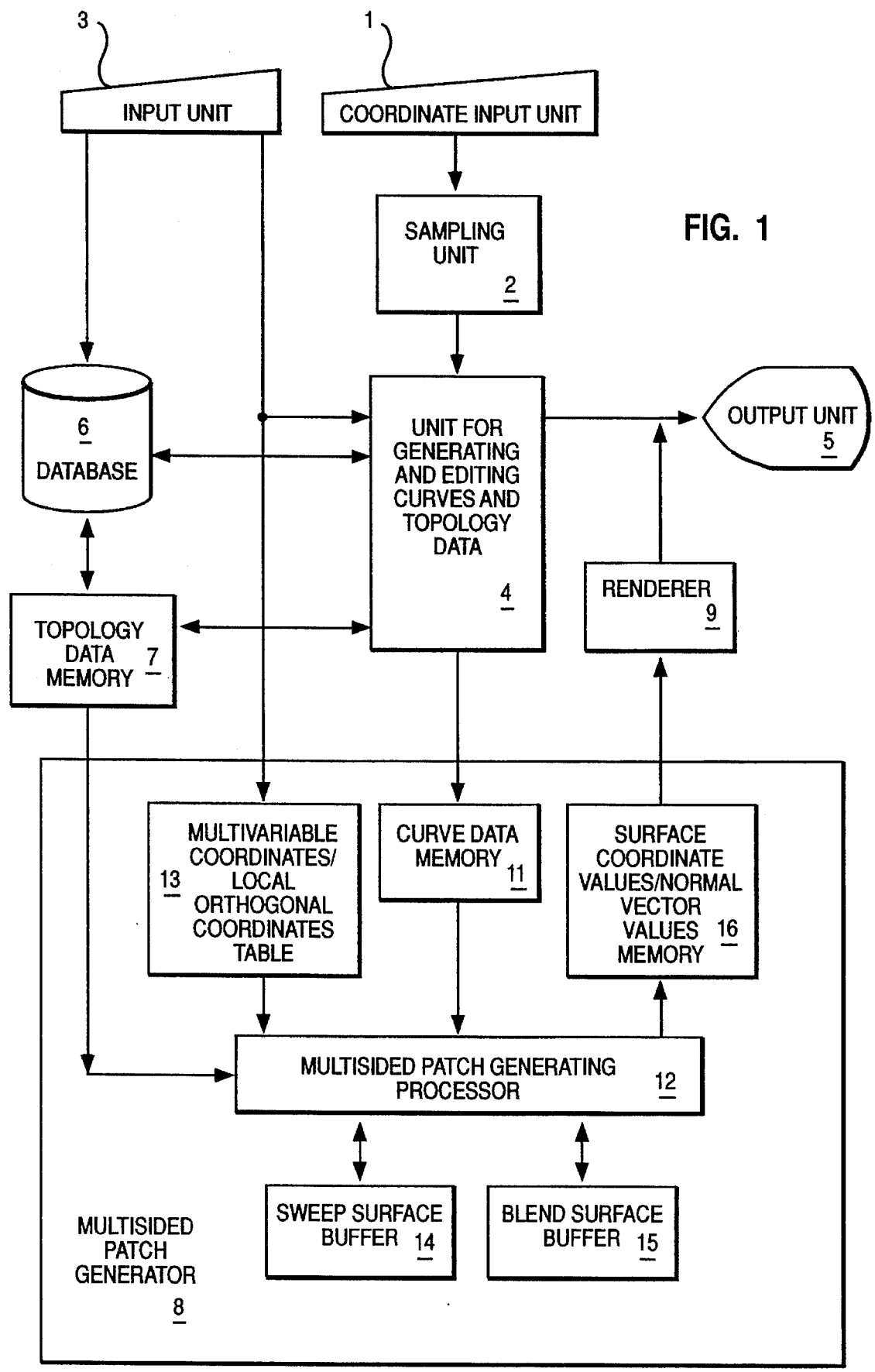
FIG. 1 is a diagram showing the construction of the system for generating a surface model according to the embodiment of the present invention.

FIG. 1 is a diagram showing the construction of the system for generating a surface model according to the embodiment of the present invention. 1 is a coordinate input unit such as a mouse or tablet, which is used to define curve formulas and input coordinate values. 2 is a sampling unit for adjusting the intervals between the input coordinate values, 3 is an input unit such as a keyboard, 4 is a unit for generating and editing curves and topology data which performs the generation and editing of curves and the generation of topology data on the basis of the input from coordinate input unit 1 or input unit 3, 5 is an output unit for outputting the result of the generation and editing, 6 is a database for holding the input data or processed result, 7 is a memory for topology data showing the configuration of input curves, 8 is a multisided patch generator for generating surface formulas on the basis of the curve formulas inputted from coordinate input unit 1 and the multivariable coordinates inputted from input unit 3 and outputting them as multisided patch data, and 9 is a renderer for performing shading of a multisided patch.

Multisided patch generator 8 includes memory 11 for holding the generated and edited curve data (such as coordinate values, tangent vectors), multisided patch generating processor 12, multivariable coordinates/local orthogonal coordinates table 13 for holding the multivariable coordinates inputted from input unit 3 and the local orthogonal coordinates converted from them, and sweep surface buffer 14 which is used for processing and holding data when the curve formulas are swept to generate a surface. Further, it includes blend surface buffer 15 which is used to process and hold data when a plurality of sweep surfaces are blended to generate a surface, and surface coordinate values/normal vector values memory 16 for holding data (coordinate values, normal vector values) of the individual points of the blended multisided patch surface. Multisided patch generating processor 12 comprises a memory in which the process procedure detailed in FIG. 8 and subsequent figures are stored in the form of a program, and it generates a multisided patch.

Figure 2:
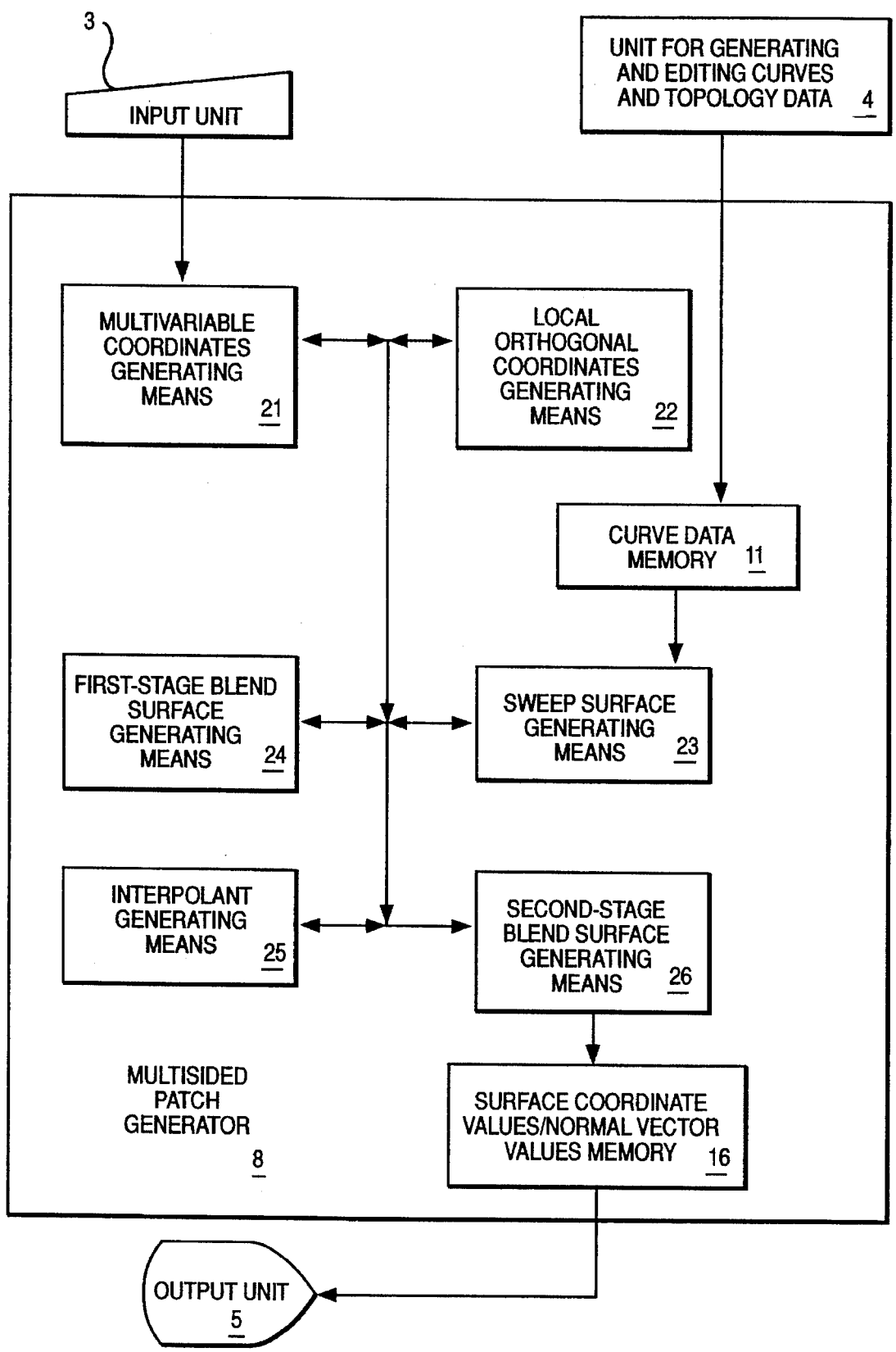
FIG. 2 is a diagram showing an example construction of the multisided patch generator in FIG. 1.

Although multisided patch generating processor 12 is of a stored program type as described above, it may be constructed with a specialized hardware for performing each function. FIG. 2 shows an example of the functional configuration of multisided patch generator 8. 21 is a multivariable coordinates generating means for constructing a multivariable coordinate system defined by m variables bi (i=1, . . . , m) for an m-sided patch, and 22 is a local orthogonal coordinates generating means for generating local parameters ui and vi from m variables for each side ei of the m-sided patch. 23 is a sweep surface generating means which uses the local parameters to calculate, from input curve formulas Ci and Ci+1, curve formulas Ci(ui) and Ci+1(vi) corresponding to the adjoining sides ei and ei+1, and generates sweep surface Si,i+1(ui, vi) with Ci(ui) as a guide curve and with Ci+1(vi) as a cross-sectional curve. 24 is a first-stage blend surface generating means which interpolates the two sweep surfaces Si,i+1 and Si,i−1 sharing the guide curve by the use of blending functions g(ui) and h(ui) to generate a blend surface Qi(ui, vi) corresponding to each side, and 25 is interpolant generating means for generating interpolants Bi defined by the m variables bi. 26 is a second-stage blend surface generating means which uses the interpolants Bi to blend the blend surfaces Qi of all the m sides into one, thereby generating a blend surface Q corresponding to a multisided patch.

Figure 3:
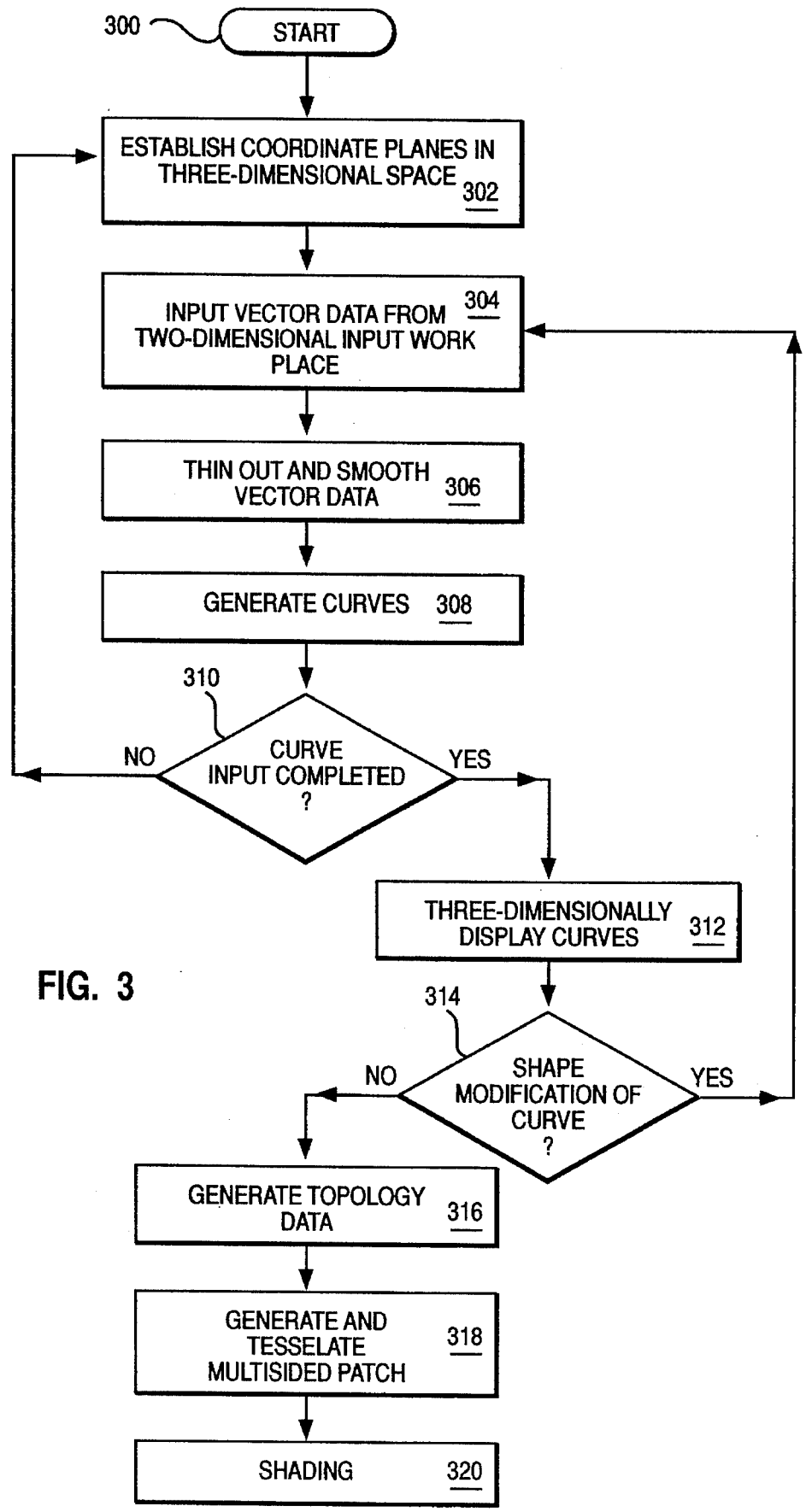
FIG. 3 is a chart showing the operation procedure of the system for generating a surface model of FIG. 1.

The operation procedure of the system for generating a surface model is described below according to FIG. 3.

First, the operator establishes coordinate planes in a three-dimensional space (step 302). For instance, as in FIG. 4, by inputting parameters via a tablet, arbitrary coordinate planes 40A, 40B and 40C are defined in a three-dimensional space 40. At this time, the following parameters are required for superposing the planes in a three-dimensional space and a coordinate system of a two-dimensional plane:

(1) Plane equation (four variables);

(2) Angle of rotation about normal (one variable): one representing a rotational component of a plane coordinate system;

(3) Center of plane (two variables): one representing a translational component of a plane coordinate system.

Figure 4:
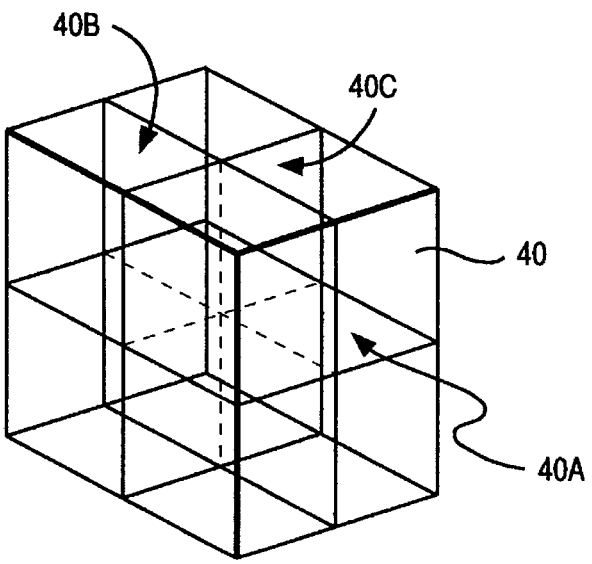
FIG. 4 is a representation showing an example of the operation for defining the coordinate planes in FIG. 3.
Figure 5:
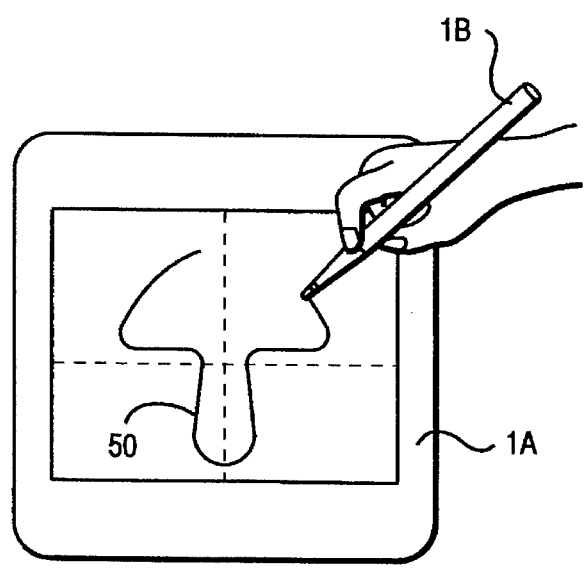
FIG. 5 is a representation showing an example of inputting data of boundary curves by a pen through a tablet.
Figure 6:
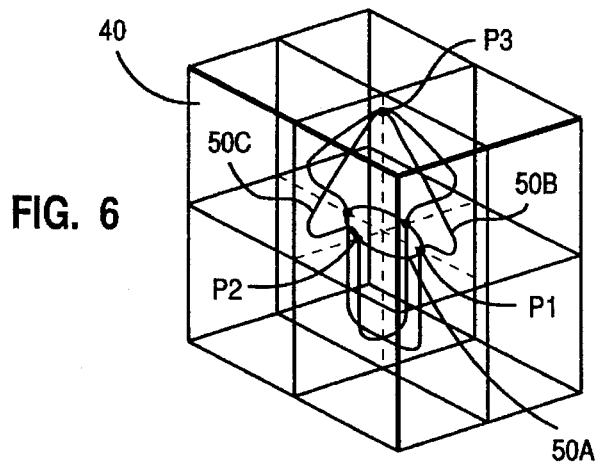
FIG. 6 is a representation showing all the input curves as displayed in a three-dimensional space.
Figure 7:
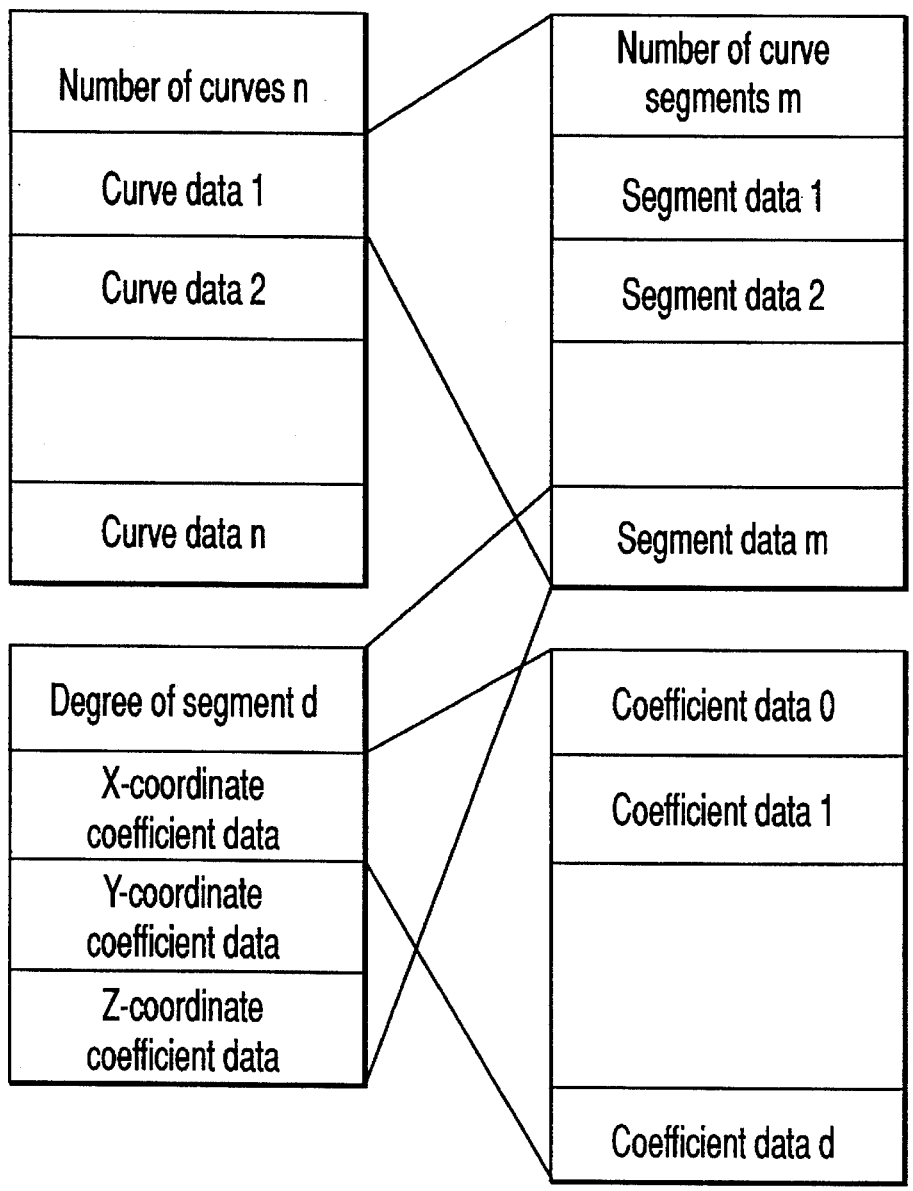
FIG. 7 is a representation showing the data structure of the curve data memory.

Now, the coordinate planes 40A, 40B and 40C are sequentially displayed on a two-dimensional input work plane such as a digitizer or tablet, and vector data of the boundary curves constituting the outline are inputted (step 304). For instance, as shown in FIG. 5, a curve 50 is directly handwritten on each coordinate plane with pen lB via tablet 1A, and its stroke data is inputted as data. To facilitate the input work, it is preferred that the three-dimensional space and coordinate planes of FIG. 4 are displayed on the screen of output unit 5, and the coordinate plane on which the input work is being performed is highlighted. Incidentally, as the input means, other means such as a three-dimensional digitizer may be employed. Vector data is thinned out and smoothed (306) to generate curves (308). A similar processing is repeated for each established coordinate plane 40A, 40B and 40C. And, all the input curves (50A, 50B, 50C) are displayed in three-dimensional space 40 as shown in FIG. 6 (312). If shape modification of the curves is necessary, the operation of the inputting of vector data (step 304) and the succeeding operations are repeated (314). When the inputting is ended, data is recorded in curve data memory 11 as shown in FIG. 7, and thereafter topology data is generated (316). That is, these plurality of curves 50A, 50B and 50C are associated with each other and managed as a curve network having a correct meaning. Specifically, using a data structure such as Boundary Representation (B-Rep), each time a new coordinate plane is established, intersection points P1, P2, P3, . . . , Pn of the plane with the plurality of curves which has been previously inputted are obtained, and newly input curves are made to pass through these intersection points to maintain conformity of the curve network. Then, the generation of multisided patch surfaces and the tessellation of the patch surfaces are performed (318), and shading is provided (320).

Figure 8:
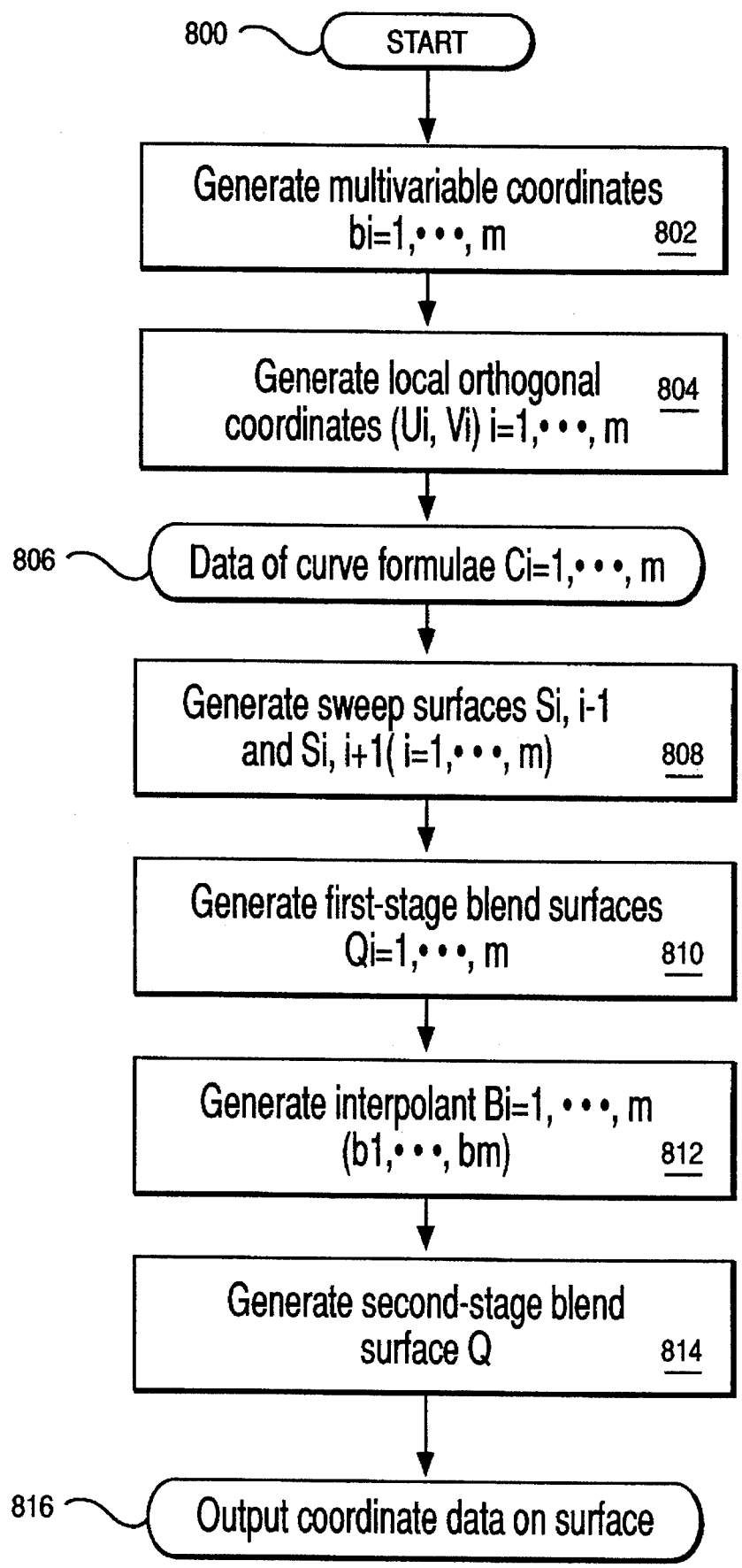
FIG. 8 is a chart showing the procedure for generating a multisided patch in FIG. 3.

The generation of multisided patch surfaces (step 318) is performed by the procedure shown in FIG. 8. First, to define fineness of a surface, a multivariable coordinate system defined by m variables bi (i=1, . . . , m) is formed for an m-sided patch (step 802). Then, local parameters (orthogonal coordinates) ui and vi are generated from the m variables bi (step 804). Next, using the local parameters ui and vi, curves Ci(ui) and Ci+1 (vi) are generated from curve formulas Ci and Ci+1 of the adjoining curves (step 806).

Then, a sweep curve Si,i+1(ui, vi) is generated with the curve Ci(ui) as a guide curve and with Ci+1(vi) as a cross-sectional curve. Similarly, a sweep curve Si,i−1(ui, vi) is generated (step 808). Further, the two sweep surfaces Si,i+1 and Si,i−1 sharing the guide curve are interpolated by blending functions g(ui) and h(ui) to generate first-stage blend surfaces Qi(ui, vi) (step 810).

And, an interpolant Bi(b1, . . . , bm) defined using the m variables bi is generated (step 812), and using this, the blend surfaces Qi(i=1, . . . , m) are again blended to generate a second-stage blended surface Q (step 814), and finally coordinate data is outputted (step 816).

Figure 9:
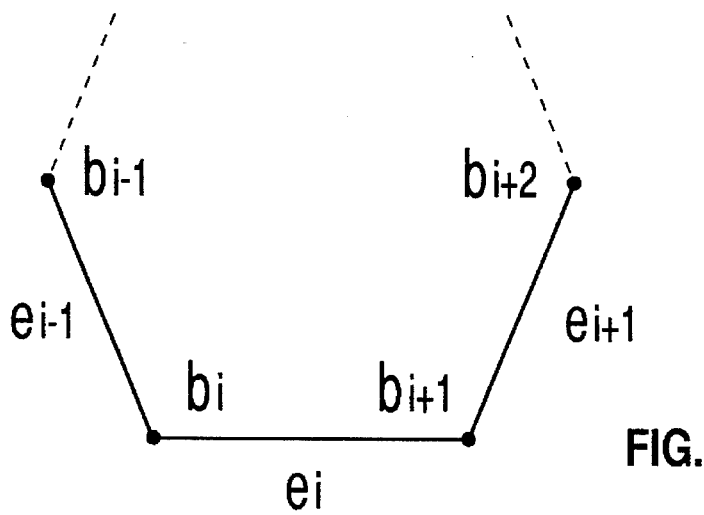
FIG. 9 is a representation showing an example of generating an m-variable coordinate system for an m-sided patch.

The respective steps in FIG. 8 are now described in detail. First, in the step 802, a pitch length for sampling the points on a surface to be inputted by the operator is inputted from input unit 3, and based on it, m sides ei (i= 1, . . . , m) are assumed for an m-sided patch as shown in FIG. 9 to generate a coordinate system of m variables bi (i=1, . . . , m) for an m-sided patch on two-dimensional coordinates. Taking the three-sided patch surrounded by intersection points P1, P2 and P3 of curves 50A, 50B and 50C in the previous examples of FIG. 6, an individual sampling point is determined by allocating values in the range of 0 to 1 for each of b1, b2 and b3 so that the sum of them is 1. For instance, if b1=b2=b3=⅓, then the center of the three-sided patch is the sampling point.

As the coordinate system, for instance, a generalized barycentric coordinate system is used. The details are shown, for instance, in the above-mentioned reference "A Multisided Generalization of Bezier Surfaces."

Figure 10:
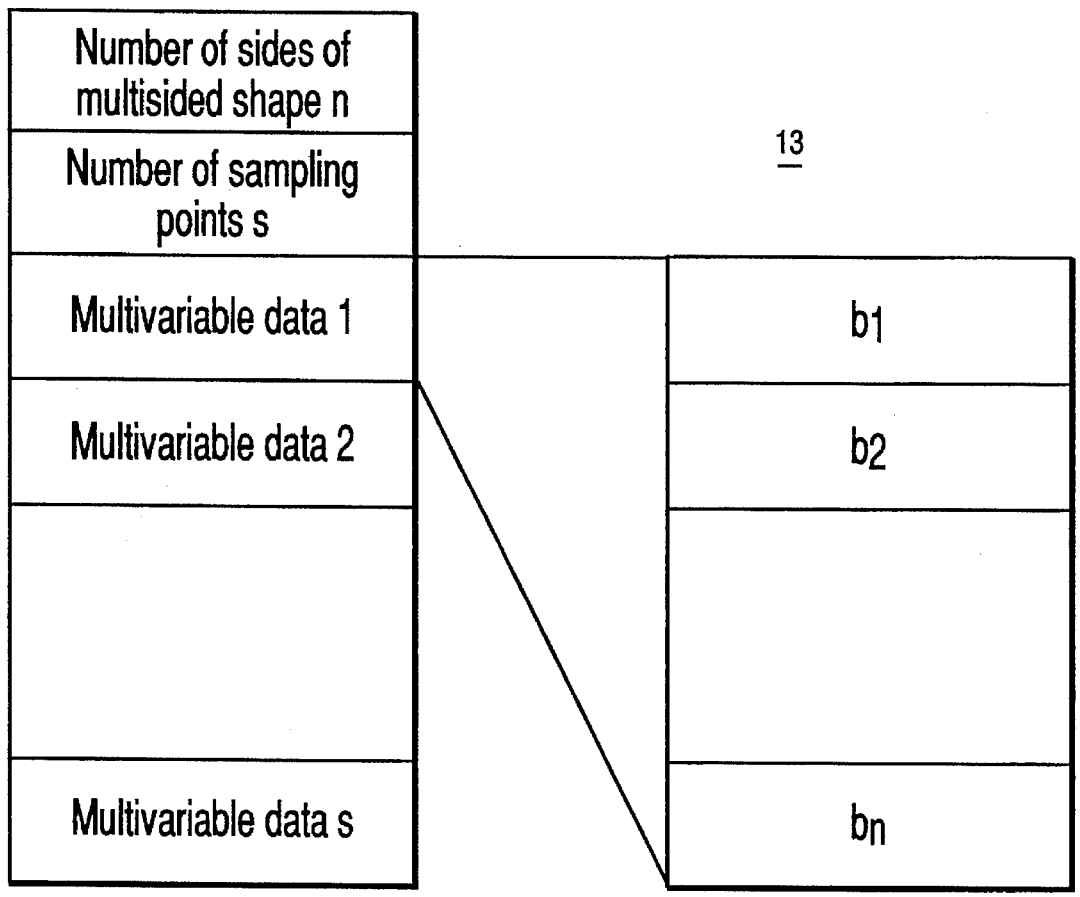
FIG. 10 is a representation showing an example data structure of the multivariable coordinate table.

An example of the data structure of multivariable coordinates table 13 is shown in FIG. 10.

Then, in step 804, local parameters ui=Fui(b1, . . . , bm) and vi=Fvi(b1, . . . , bm) are calculated from the m variables for each side ei (i=1, . . . , m) of the m-sided patch. At this time, conditions of (0≦ui≦1, vi=0) on the side ei of the m-sided patch, (0≦vi≦1, ui=0) on the side ei−1 and (0≦vi≦1, ui=1) on the side ei+1 are satisfied.

For instance, the variables and local parameters are put in the following relationships:

$wi=1$, for $m=2h$;

$wi=1/(1-bi+h+1)$, for $m=2h+1$;

$Fui(b1, \ldots, bm)=wi\ (bi+1+, \ldots, +bi+h)$;

$$Fv_i(b1,\ldots,bm) = w_i \, (b_{i+2}+,\ldots,+b_{i+m-1}).$$

Accordingly, for the side ei, at point bi, ui is 0 and vi is also 0; at point bi+1, ui is 1 and vi is 0; at point bi−1, ui is 0 and vi is 1; and at point bi+2, ui is 1 and vi is also 1.

Figure 11:
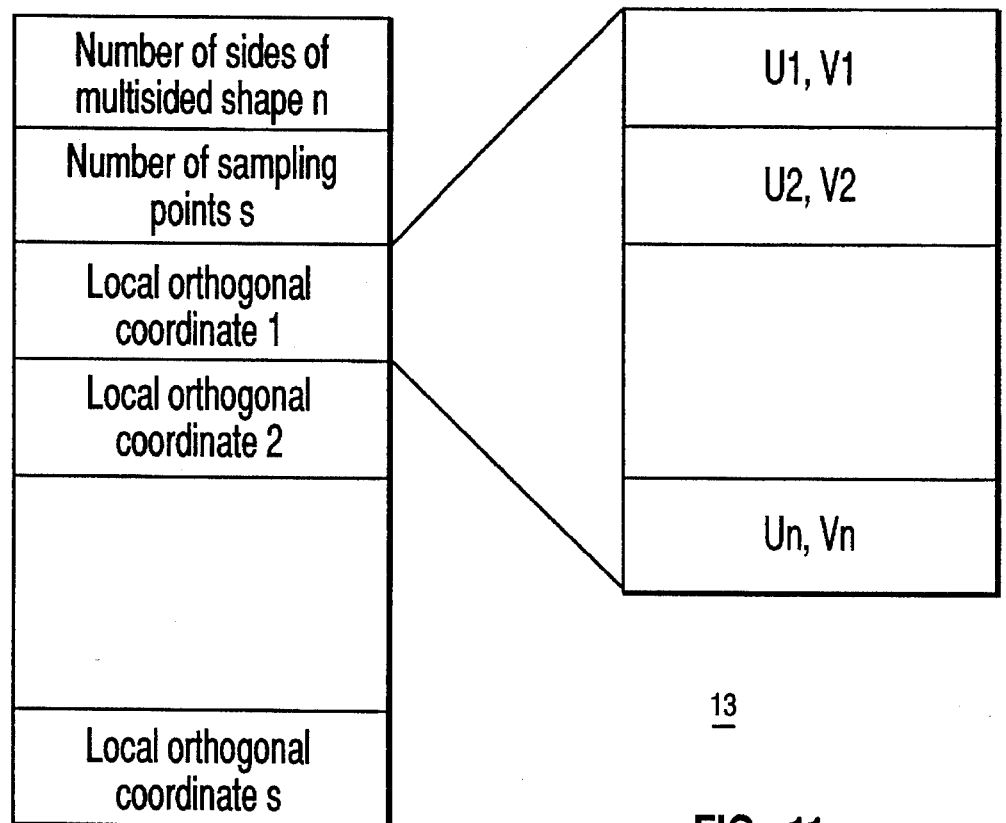
FIG. 11 is a representation showing an example data structure of the local orthogonal coordinate table.

An example of the data structure of local orthogonal coordinates table 13 is shown in FIG. 11.

Figure 12:
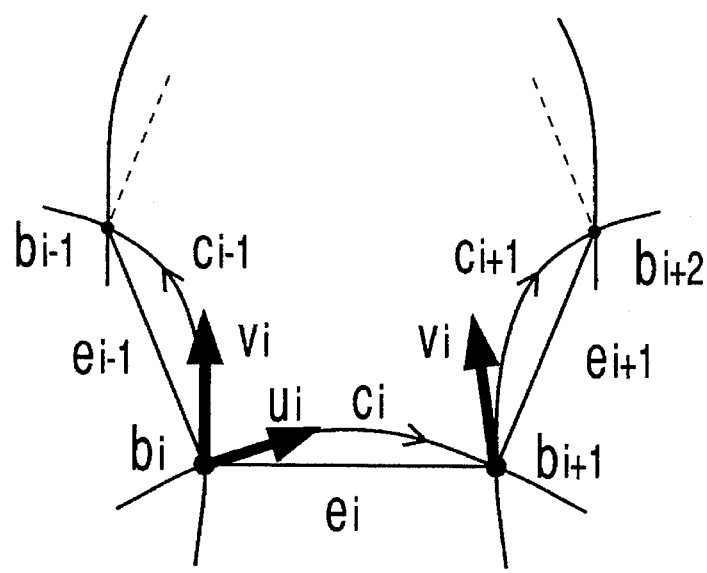
FIG. 12 is a representation showing the process of calculating curve $C_i(u_i)$ using local parameters in FIG. 8.
Figure 13:
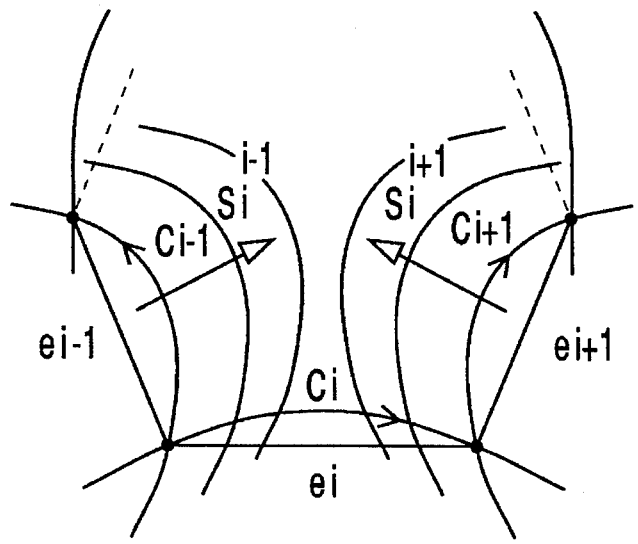
FIG. 13 is a representation showing the process of generating sweep surfaces in FIG. 8.

In addition, in step 806, as shown in FIG. 12, data of the curve formulas Ci, Ci+1 and Ci−1 corresponding to the adjoining sides ei, ei+1 and ei−1 of the m-sided patch is fetched, and curves Ci(ui), Ci+1(vi) and Ci-l(vi) are calculated using the local parameters ui and vi. In step 808, a sweep surface Si,i+1(ui, vi) is generated with the curve Ci(ui) as a guide curve and with the curve Ci+1(vi) as a cross-sectional curve (FIG. 13):

$$S_{i,i+1}(ui, vi) = C_{i+1}(vi) - C_{i+1}(0) + C_i(ui).$$

Similarly, a sweep surface Si,i−1(ui, vi) is generated with the curve Ci(ui) as a guide curve and with the Ci−1(vi) as a cross-sectional curve:

$$S_{i,i+1}(ui, vi) = C_{i-1}(vi) - C_{i+1}(0) + C_i(ui).$$

Figure 14:
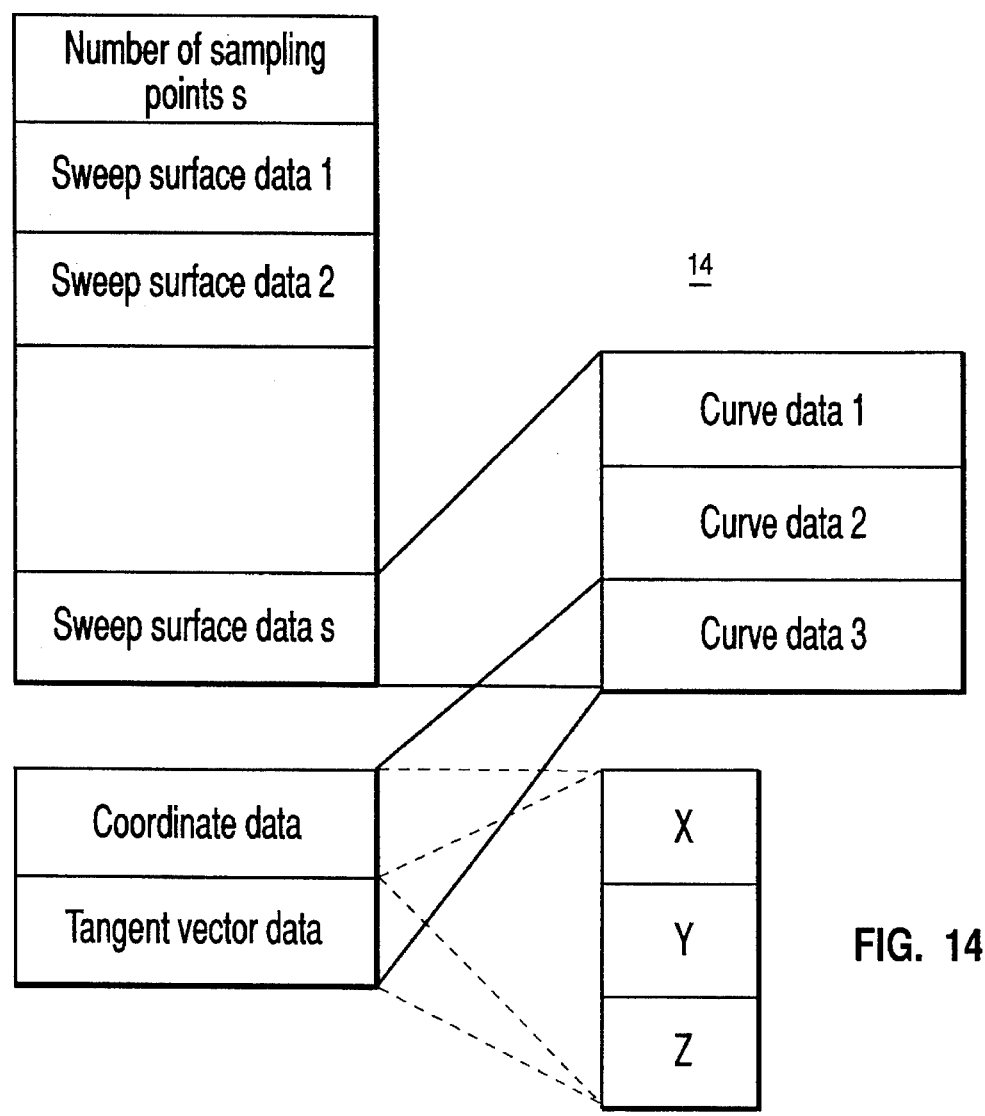
FIG. 14 is a representation showing an example data structure of the sweep surface buffer.

An example of the data structure of sweep surface buffer 14 is shown in FIG. 14.

Incidentally, for the details of the generation of sweep surfaces, refer to, for instance, B. K. Choil and C. S. Lee, "Sweep surfaces modelling via coordinate transformations and blending," *Computer-aided-design*, Volume 22, Number 2, March 1990.

Figure 15:
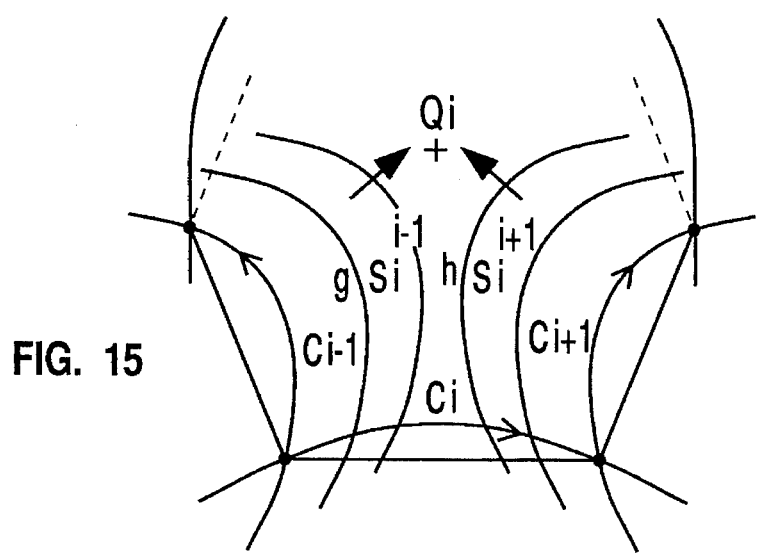
FIG. 15 is a representation showing the process of generating the first-stage blend surface.

In step 810 as shown in FIG. 15, the two sweep surfaces Si,i+1 and Si,i−1 sharing the guide curve Ci(ui) are blended by blending functions g(ui) and h(ui) to generate a blend surface:

$$Q_i(ui, vi) = g(ui) * s_{i,i-1}(ui, vi) + h(ui) * S_{i,i+1}(ui, vi)$$

(generation of a first-stage blend surface).

At this time, it is supposed that the blending functions satisfy an interpolatory condition of g(0)=h(1)=1 and g(ui)+h(ui)=1:

$$g(ui) = 1 - ui;$$

$$h(ui) = ui$$

In order to assure high geometric continuity of a surface on each side, the interpolatory condition is determined so that continuity is of the same level as the inputted curve formulas Ci, Ci+1 and Ci−1.

Figure 16:
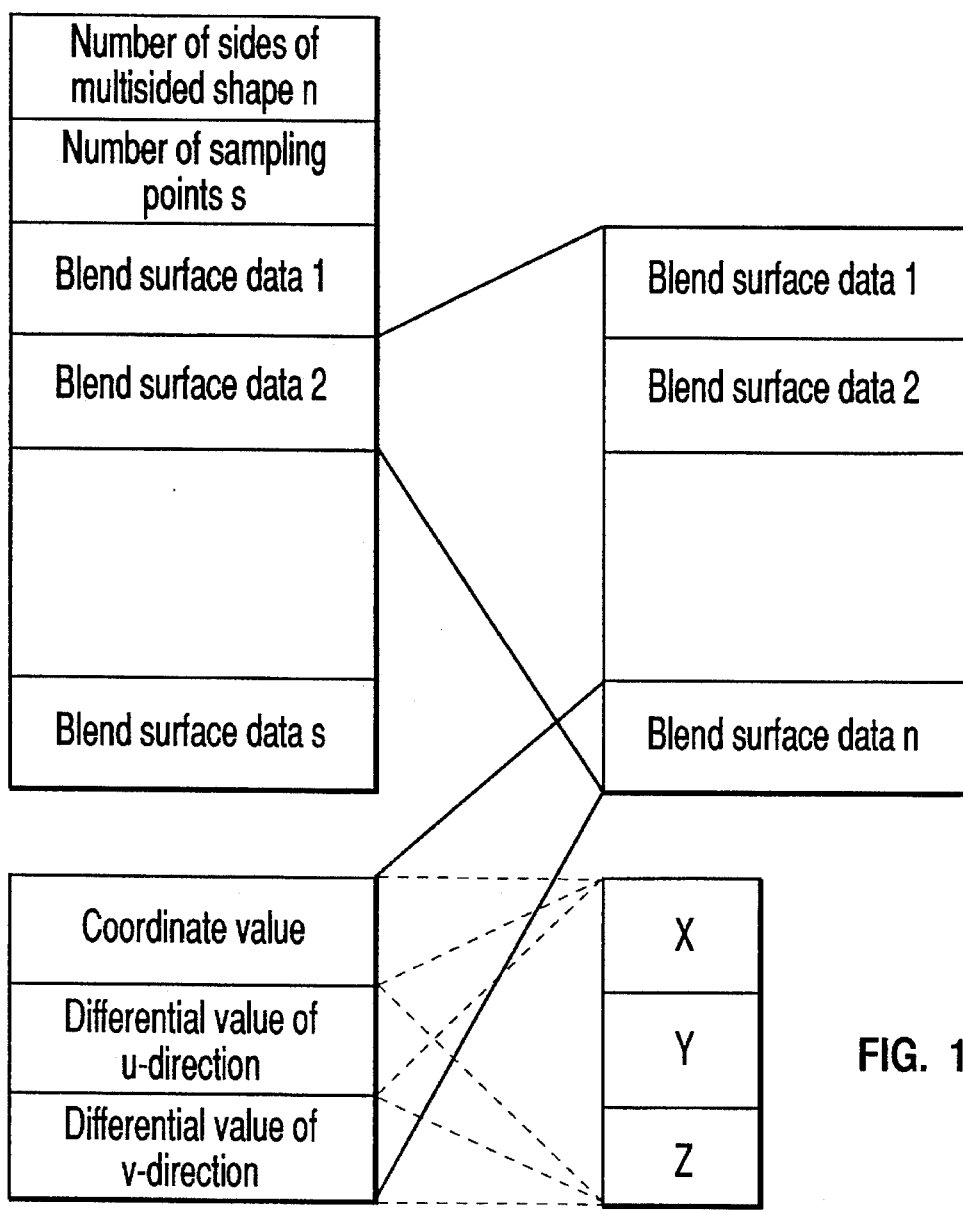
FIG. 16 is a representation showing an example data structure of the blend surface buffer.

In this way, for one side of an m-sided shape, one blend surface Qi is generated from the adjoining three curve formulas Ci, Ci+1 and Ci−1. Similarly, a blend surface Qi is generated for each side ei of the m-sided patch. Data of the blend surface Qi has a data structure as shown in FIG. 16 and is held in blend surface buffer 15.

Incidentally, the details of the generation of blend surfaces are described, for instance, in the above stated "Transfinite, Visually Continuous, Triangular Interpolant."

Figure 17:
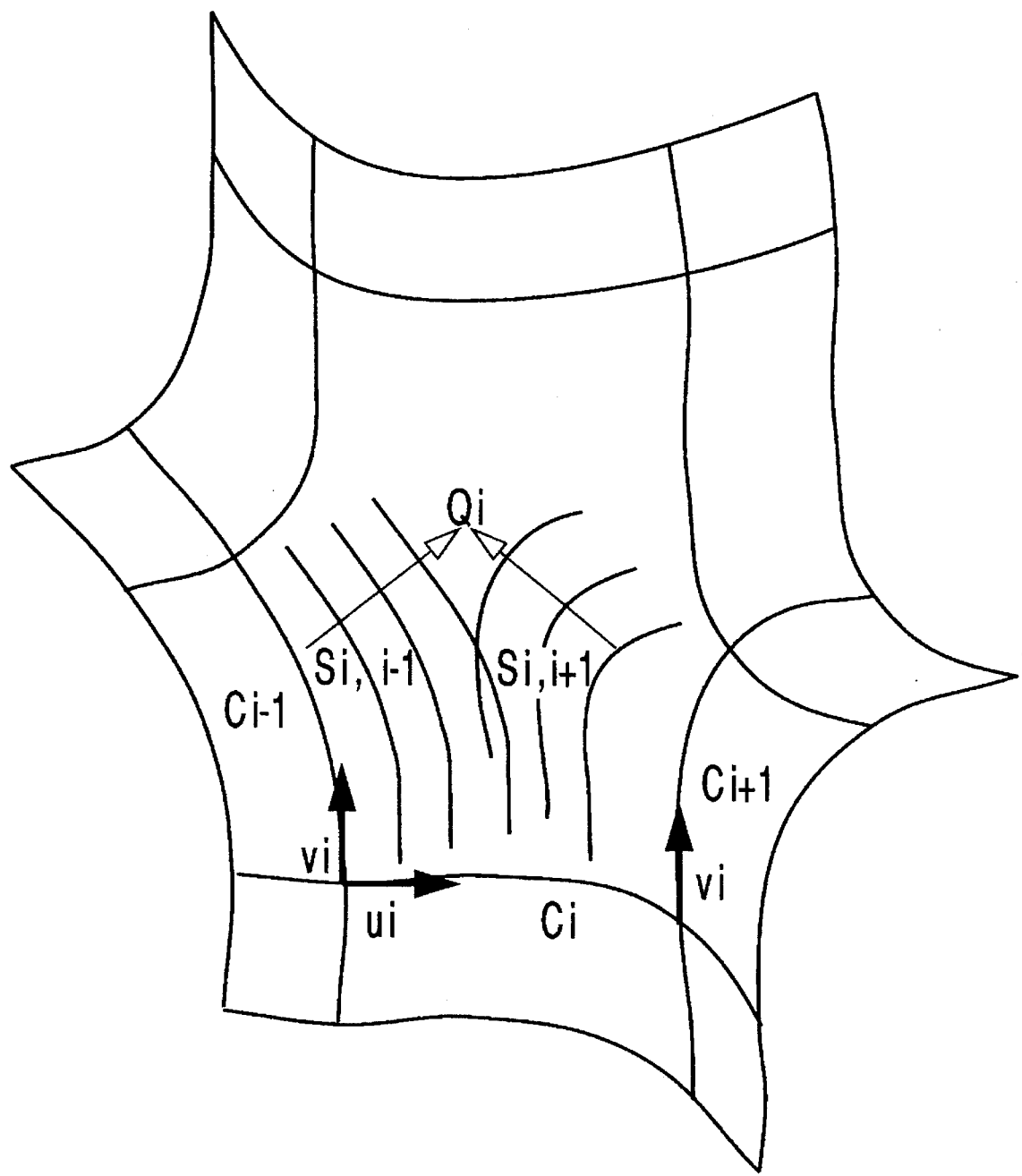
FIG. 17 is a representation three-dimensionally showing the first-stage blend surface.

FIG. 15 two-dimensionally shows the generation of first-stage blending of a surface, while FIG. 17 shows it three-dimensionally.

Figure 18A:
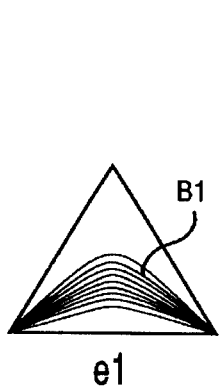
FIG. 18 is a representation showing examples of the level line of the interpolant $B_i$ for side $e_1$ of a regular triangle, square and pentagon.
Figure 18B:
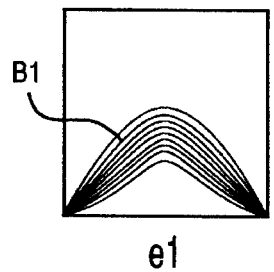
Figure 18C:
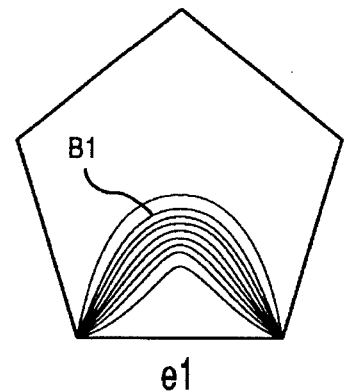

In step 812, the values of the interpolant Bi(b1,..., bm) defined using the m variables bi is calculated. In FIG. 18, examples of level line of the interpolant B1 for side el of a regular triangle, square and pentagon are shown. The value of the interpolant B1 is 1 on side el, becomes smaller as it departs more from side el, and is 0 on the sides other than side el.

In step 814, the m blend surfaces Qi (i=1,..., m) generated in step 810 are blended using the interpolant Bi, thereby generating a blend surface Q (generation of the second-stage blend surface):

$$Q(b1,\ldots,bm) = (Q1B1+,\ldots,+Qmbm)$$

Figure 19:
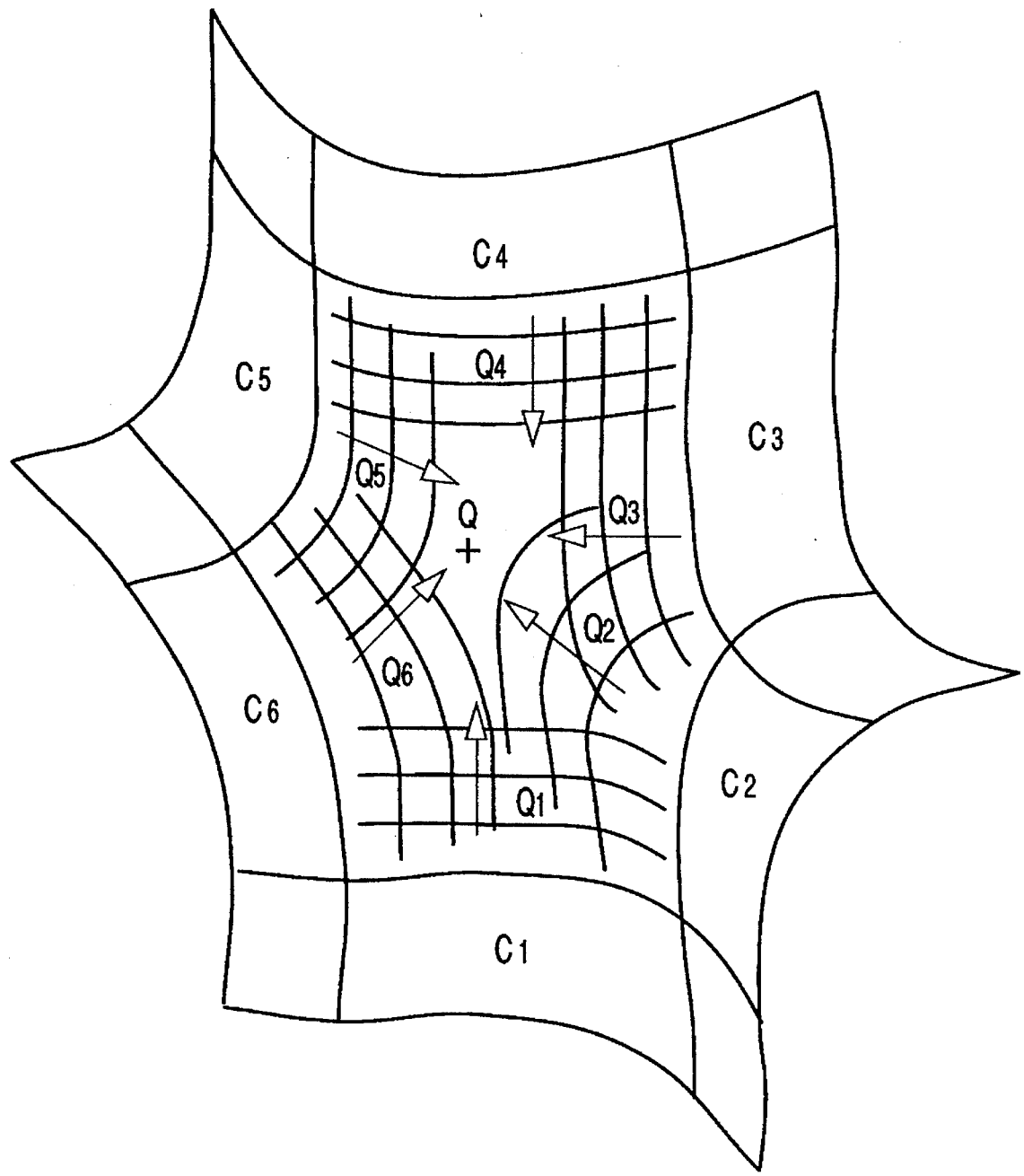
FIG. 19 is a representation showing an example of the patch surface Q generated by the second-stage blending.

In other words, data of the m blend surfaces Q1...Qm is added for a distribution such as the level lines in FIG. 18. FIG. 19 shows an example of the patch surface Q(b1,..., bm) generated by the second-stage blending.

Figure 20:
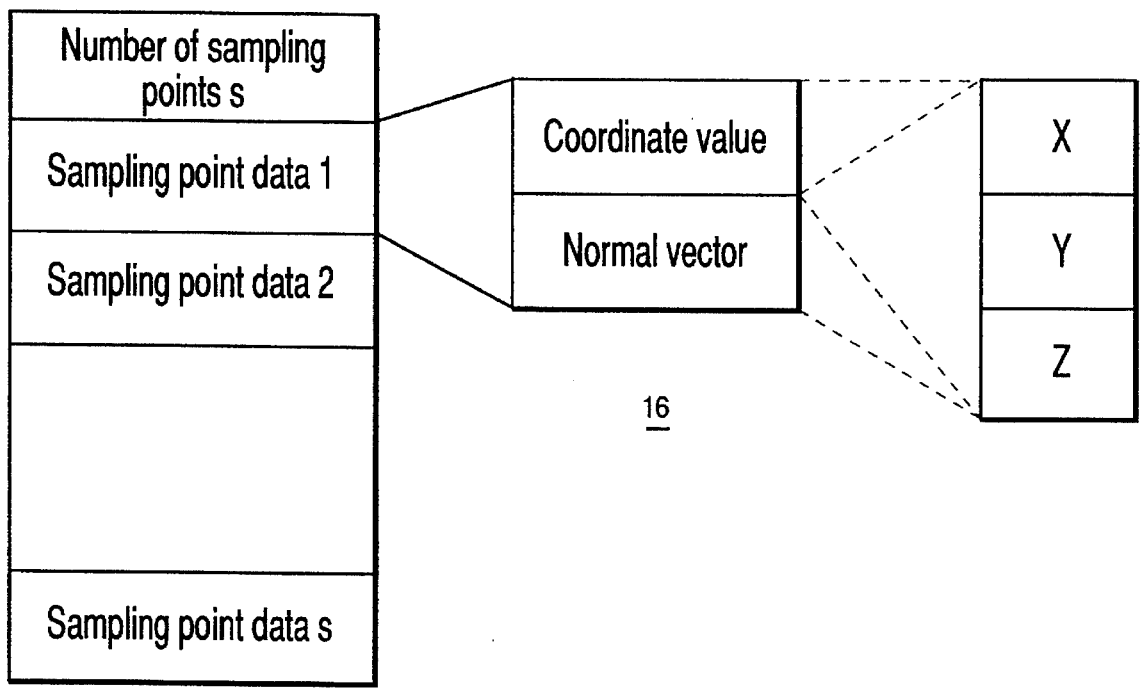
FIG. 20 is a representation showing an example data structure of the surface coordinate values/normal vector values memory.

Data of the generated patch surface Q is held in surface coordinate values/normal vector values memory 16 with the data structure, an example of which is shown in FIG. 20.

In order to acquire high geometric continuity between the surfaces, it is needed to decide the interpolatory condition so that geometric continuity is of the same level as parametric continuity of the input curve formulas Ci, Ci+1 and Ci−1. For instance, if parametric continuity of the input curves is three-dimensional, then geometric continuity of the interpolant Bi should also be three-dimensional.

At this time, the interpolant Bi(b1,..., bm) should satisfy the following condition:

$$B_i(b1,\ldots,bm) = 1, \text{ for } b_i + b_{i+1} = 1,$$

$$B_i(b1,\ldots,bm) = 0, \text{ for } b_j + b_{j+1} = 1, j \neq i,$$

$$d^h B_i(b1,\ldots,bm) \, d^h b_j = 0, \text{ for } j = 1,\ldots, m,$$

$$b_j + b_{j+1} = 1 \; j \neq i$$

where bj+bj+1=1 represents that a variable bi(i=1,..., m) is on side ej.

For instance, in FIG. 19, Bi is 1 on curve C1 and 0 on curves C2 to C6, and the values of cross-directional derivatives on curves C1 to C6 are also 0.

Figure 21:
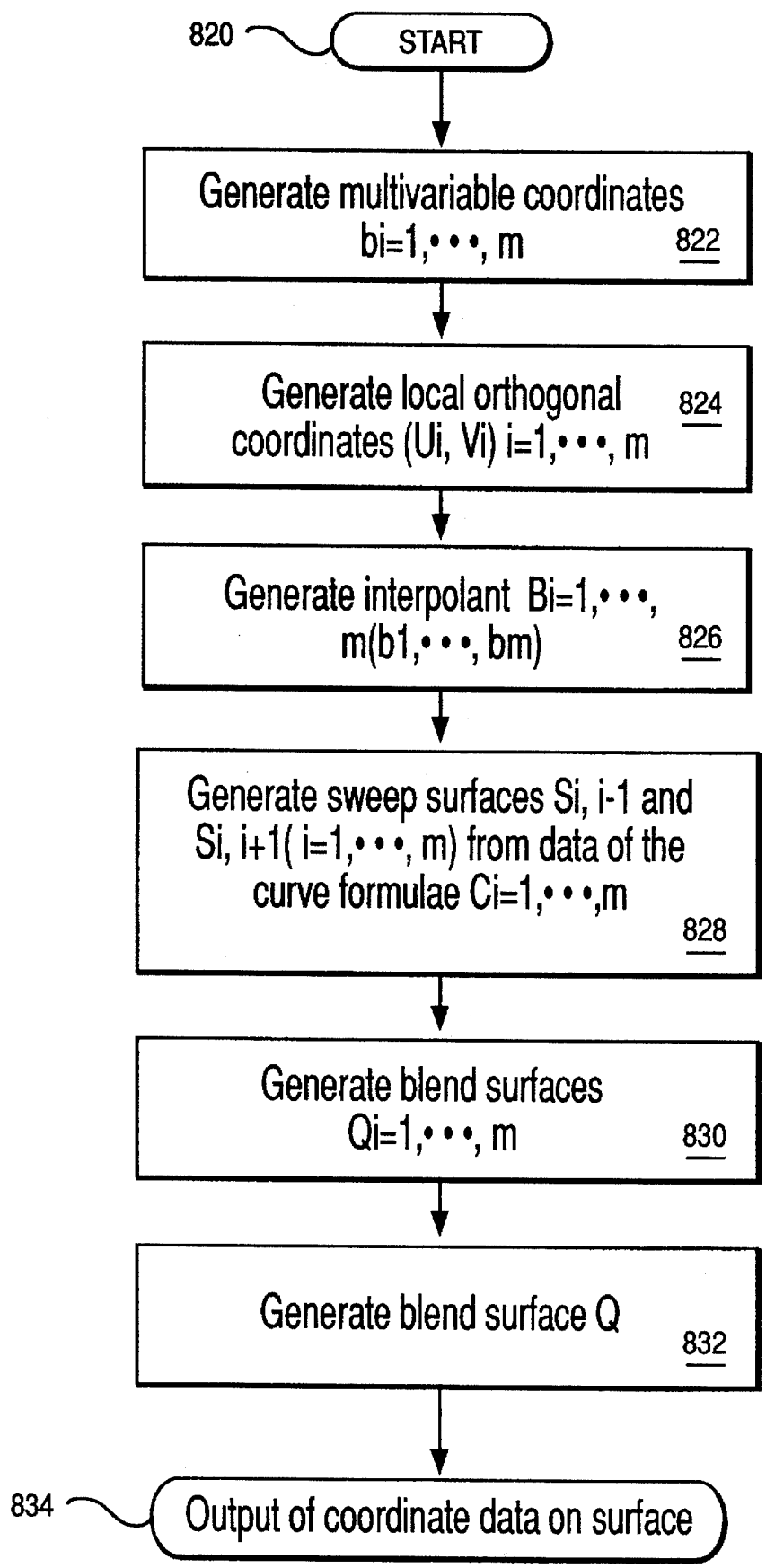
FIG. 21 is a chart showing another example of the method for generating a multisided patch surface.

The generation of a multisided patch may be performed by the procedure shown in FIG. 21 instead of the arrangement of FIG. 2 or the procedure of FIG. 8.

That is, it is a method in which a blended surface is calculated by an interpolant Bi for each side and then the blend surfaces for all the sides are added together. First, a multivariable coordinate system bi(i=1,..., m) is formed (step 822) and local orthogonal coordinates ui and vi are generated (step 824). On the other hand, an interpolant Bi(b1,... bm) defined using the m variables bi is generated (step 826).

Then, using the local parameters ui and vi, curves Ci(ui) and Ci+1(vi) are generated from the curve formulas Ci and Ci+1 of the adjoining curves, and sweep surfaces Si, i+1(ui, vi) and Si,i−1(ui, vi) are generated (step 828).

Next, the two sweep surfaces Si, i+1 and Si, i−1 sharing the guide curve are interpolated using blend functions g(ui) and h(ui) and the interpolant Bi(b1,..., bm) to generate a blend surface Qi(ui, vi) (step 830).

Subsequently, the blend surfaces Qi(i=1,..., m) for the individual sides are added together to generate a blend surface Q (step 832), and finally coordinate data is outputted (step 834). The same result as the case of FIG. 8 is also obtained by this method.

Figure 22:
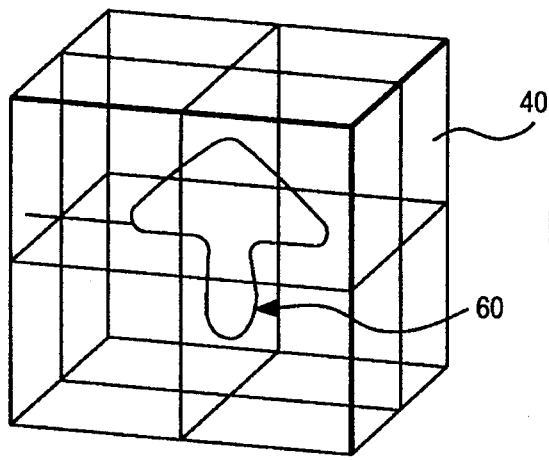
FIG. 22 is a representation showing a wire frame of the patches generated on the basis of the curve formulae defined in FIGS. 4 to 6.

By performing the above described procedure for generating an m-sided patch surface for all of the multisided patches, a three-dimensional free-form surface can be generated. FIG. 22 shows a wire frame 60 of the patch generated on the basis of the curve formulas defined in FIGS. 4 to 6.

The blend surface Q generated by the method of the present invention saves the value of a curve on side ei and values up to the hth derivative in the orthogonal direction with side ei.

For instance:

$$Bi(b1, \ldots, bm) = (bibi+1)^h / \{(b1b2)^h + (b2b3)^h +, \ldots, +(bm-1bm)^h + (bmb1)^h\}$$

The reason for this is as follows.

First, since the data input of curve formulas by the operator is performed by a direct handwriting input method through a digitizer or tablet, curve formulas can be simply and intuitively defined as compared with the conventional numerical value input method, in which the data of curve formulas is inputted by means of the coordinate values of a group of points and the differential values of the individual points. Also, it is possible to give geometric continuity Gn of a very high level to the input curve formulas. And, by giving geometric continuity of the same level as the input curve formulas with respect to the blending functions in generation of the first-stage blend surface on the basis of the curve formulas and with respect to the interpolant in generation of the second-stage blend surface, the generated blend surface Q would have geometric continuity of a level as high as parametric continuity Gn of the input curve formulas.

Figure 23:
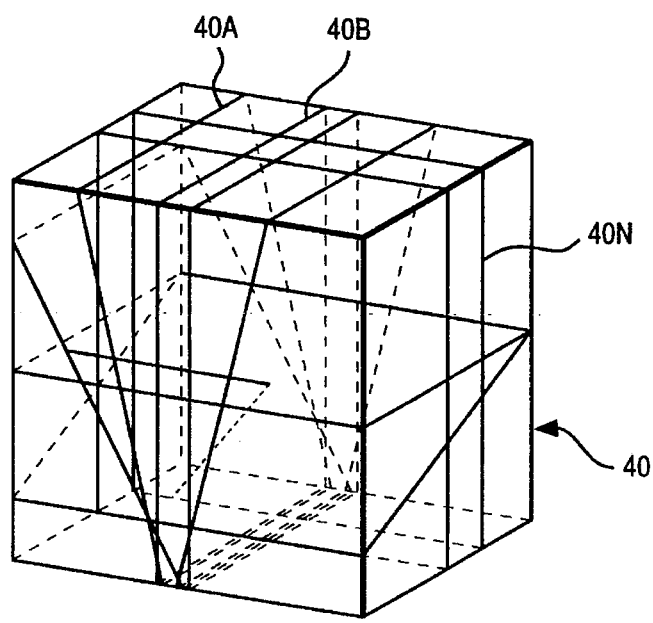
FIG. 23 is a representation showing an example of defining many two-dimensional planes.
Figure 24:
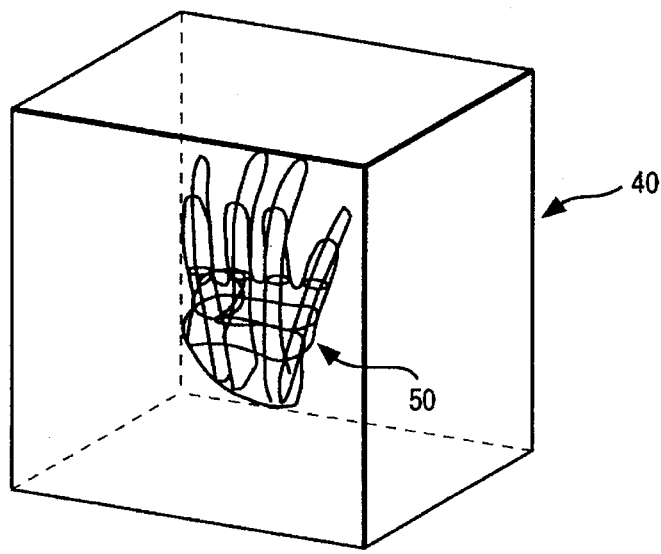
FIG. 24 is a representation showing an example surface model using the two-dimensional planes defined in the example of FIG. 23.

To generate a complex surface model, it is only needed to finely define coordinate planes. For instance, by defining many two-dimensional planes (40A to 40N) as shown in FIG. 23, boundary curves 50 defining a complex surface model as shown in FIG. 24 can be simply inputted.

Figure 25:
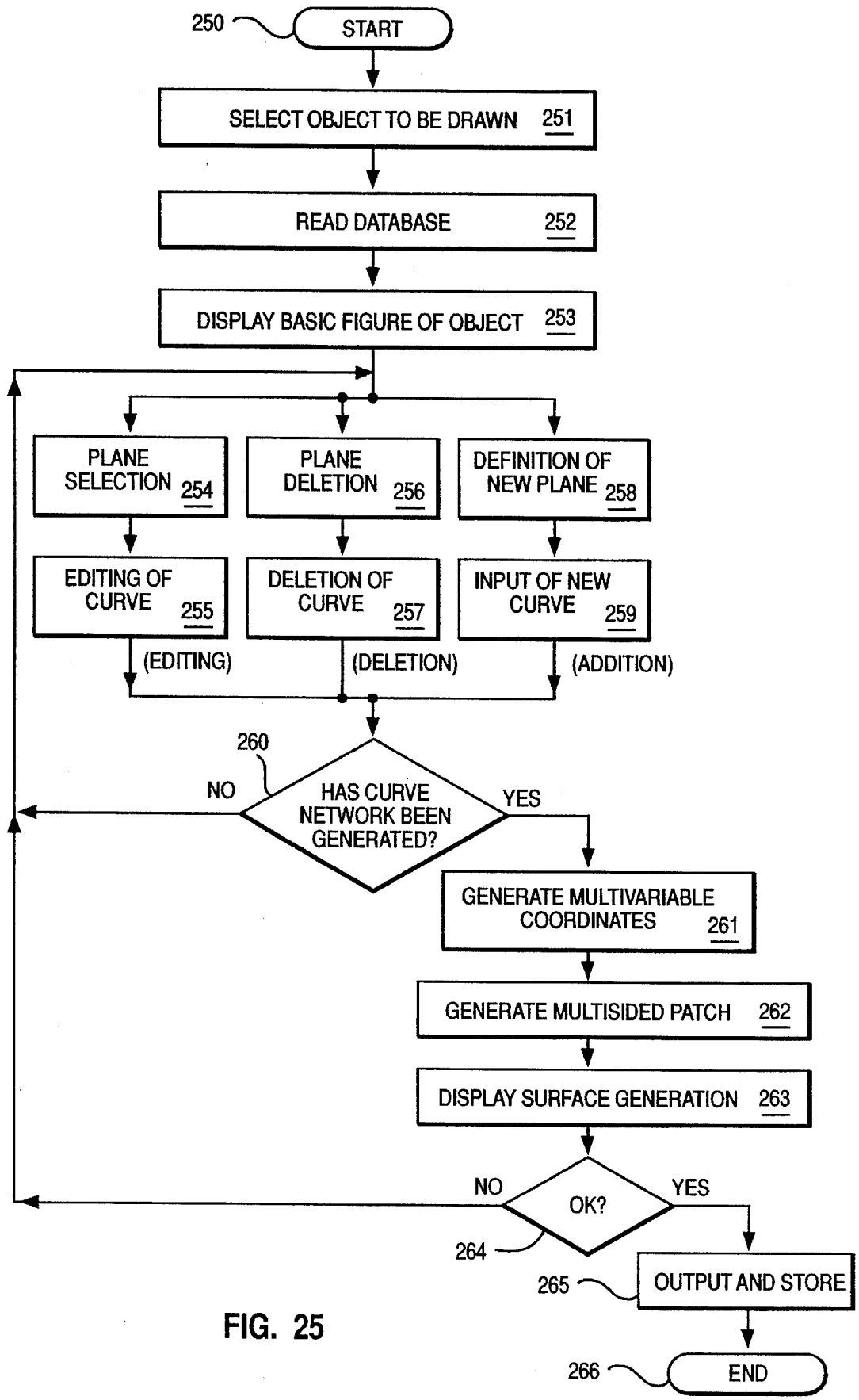
FIG. 25 is a chart showing another example of the modeling system incorporating the present invention.

Since data in the process of generating a multisided patch is recorded in the respective memory means or database, it can be reused. FIG. 25 shows an example of the modeling system in which the database for curves is reusable. In this system, the list of models in which data is reusable is presented to a user, and the model selected by the user is chosen as an object to be drawn (step 251). Then, the database for curves is read in and displayed on a display unit as a basic shape of the object to be drawn. That is, coordinate planes and boundary curves corresponding to FIG. 6 are displayed (step 253). The user performs editing for making modifications and changes required for the basic shape via a tablet. For reference for the edit work, it is preferred to display the boundary curves of the basic shape as well as the coordinate plane on which the input work is being done. Addition or deletion of coordinate planes allows the user to draw a figure in more detail or more simply (steps 256 to 259). When the generation of a curve network is completed, work for generating a patch surface is performed in a manner similar to that depicted in FIG. 8. When the user looks at the displayed model surface and feels further change is needed, a similar processing may be repeated. This modeling system can be used not only for industrial design but also for a drawing system for children by preparing, for instance, a basic figure such as an animal or vehicle as the object to be drawn and enabling the boundary curves to be modified freely.

Since the curve formulae of the present invention are defined in a multivariable barycentric coordinate system, a patch having any number of sides can be generated without subdividing a region. In addition, surface formulae are defined on the basis of the curve formulae of given boundaries when the boundaries of a surface are expressed, there is no restriction on the form of parametric expression of the curve formulae.

Accordingly, a handwriting input method such as a combination of a tablet and a pen can be used as the means for inputting and editing curves, and thus an interface called sketch familiar to designers can be provided. Since curves on a surface which are intuitively responsive to a shape are used as the approach for defining a surface, designers can simply input necessary data, and consequently they can generate patch surfaces without need for specialized operators.

What is claimed is:

1. A method of using a multisided patch generator to generate a free-form surface by inputting data on boundary curves and spanning a multisided patch as a surface interpolating said boundary curves, said method comprising the steps of:

forming a multisided coordinate system defined by m variables bi (i=1, ..., m) for an m-sided shape and storing said m variables bi in a table;

generating local parameters ui and vi from said m variables bi for each side ei of said m-sided shape and storing said local parameters ui and vi in said table;

calculating curve formulas Ci, Ci+1 and Ci−1 corresponding to the side ei and the adjoining sides ei+1 and ei−1 using said local parameters, said calculating performed by a multisided patch generating processor;

generating sweep surfaces Si,i+1 and Si,i−1 with said Ci as a guide curve and with Ci+1 and Ci−1 as cross-sectional curves, said generating performed by said multisided patch generating processor;

interpolating said two sweep surfaces Si,i+1 and Si,i−1 sharing said guide curve using a blending function g(ui) and a blending function h(ui) to generate a blend surface Qu(ui, vi), said interpolating performed by said multisided patch generating processor; and combining said blend surfaces Qi to generate a multisided patch, said combining performed by said multisided patch generating processor.

2. A method as set forth in claim 1 wherein said blend surfaces Qi are blended using interpolants Bi defined by said m variables bi to generate said multisided patch.

3. A method as set forth in claim 1 wherein said two sweep surfaces Si,i+1 and Si,i−1 sharing said guide curve are interpolated using said blending functions g(ui) and h(ui) and interpolants Bi defined by said m variables bi to generate said blend surface Qi(ui, vi).

4. A method as set forth in claim 1 wherein said blend surfaces Qi are added together to generate said multisided patch.

5. A method as set forth in claim 1, further comprising the step of generating a shaded image of said multisided patch.

6. Apparatus, for generating a free-form surface, comprising:

input means for inputting data on a plurality of curves defining an m-sided shape;

editing means for generating and editing curves;

memory means for storing curve data related to said plurality of curves;

means for generating multisided patches having multi-variable coordinate system generating means for generating, for an m-sided shape, a multivariable coordinate system defined by m variables bi (i=1, ..., m);

local orthogonal coordinates generating means for generating, for each side ei of said m-sided shape, local parameters ui and vi from said m variables bi;

curve formula calculating means for calculating curve formulas Ci, Ci+1 and Ci−1 corresponding to the side ei and the adjoining sides ei+1 and ei−1 using said local parameters;

sweep surface generating means for generating sweep surfaces Si,i+1 and Si,i−1 with said Ci as a guide curve and with said $C_{i+1}$ and $C_{i-1}$ as cross-sectional curves;

blend surface generating means for interpolating said two sweep surfaces $S_{i,i+1}$ and $S_{i,i-1}$ sharing said guide curve using a blending function $g(u_i)$ and a blending function $h(u_i)$ to generate a blend surface $Q_i(u_i, v_i)$;

patch surface generating means for combining said blend surface $Q_i$ to generate an m-sided patch; and output means, wherein a free-form surface including a multisided patch surrounded by given boundary curves is generated, wherein said means for generating multisided patches respectively sweeps, for each side of said m-sided shape and along the boundary curve of said plurality of boundary curves which defines said side, a pair of other boundary curves intersecting said side to generate a pair of sweep surfaces, and blending and adding together the sweep surfaces using an interpolatory function for the whole of said m-sided shape, thereby generating an m-sided patch.

7. Apparatus as set forth in claim 6, further comprising means for generating a shaded image of said m-sided patch.

8. Apparatus as set forth in claim 6 wherein said blend surface generating means comprises first-stage blend surface generating means, said patch surface generating means comprising:

interpolants generating means for generating interpolants $B_i$ defined by said m variables $b_i$; and second-stage blend surface generating means for blending said blend surfaces $Q_i$ using said interpolants $B_i$ to generate said m-sided patch.

9. Apparatus as set forth in claim 6 wherein said blend surface generating means interpolate said two sweep surfaces $S_{i,i+1}$ and $S_{i,i-1}$ sharing said guide curve using said blending functions $g(u_i)$ and $h(u_i)$ and interpolants $B_i$ defined by said m variables $b_i$ to generate said blend surface $Q_i(u_i, v_i)$.

10. Apparatus as set forth in claim 6 wherein said patch surface generating means adds the blend surfaces $Q_i$ together to generate said m-sided patch.

* * * * *